United States Patent [19]

Showalter

[11] 4,216,605
[45] Aug. 12, 1980

[54] METHOD OF MAKING A FISHING LURE

[75] Inventor: Joseph S. Showalter, Winter Park, Fla.

[73] Assignee: Boone Bait Company, Inc., Orlando, Fla.

[21] Appl. No.: 924,927

[22] Filed: Jul. 17, 1978

[51] Int. Cl.³ ............................................ A01K 85/00
[52] U.S. Cl. ................................................. 43/42.53
[58] Field of Search ................. 43/42.53, 42.39, 42.49; 76/DIG. 3

[56] References Cited

U.S. PATENT DOCUMENTS

| | | | |
|---|---|---|---|
| 870,069 | 11/1907 | Wilcox | 43/42.14 |
| 2,163,666 | 6/1939 | Carter et al. | 43/42.33 |
| 2,774,169 | 12/1956 | Matz | 43/42.36 |
| 2,776,518 | 1/1957 | Felmlee | 43/42.36 |
| 2,938,293 | 5/1960 | Richardson | 43/42.36 |

FOREIGN PATENT DOCUMENTS 685135 12/1952 United Kingdom .................... 43/42.53

Primary Examiner—Othell M. Simpson
Assistant Examiner—Roscoe V. Parker
Attorney, Agent, or Firm—Duckworth, Hobby, Allen & Pettis

[57] ABSTRACT

The method of making a fishing lure includes the steps of applying a barrier coat to the cavity of a pair of mold halves, slipping an elongated hollow tube or an elongated hollow tube and hollow metal weight onto a mandrel, placing the mandrel across the cavity of one mold half with the tube or tube and weight within the bounds of the cavity, charging the mold cavity and clamping the mold halves together for curing the body. The body is removed from the molds, the elongated mandrel is pulled from the body leaving the elongated tube or tube and weight formed in the body, then painting, decorating and attaching the screw eyes and hooks through the removed mandrel openings.

6 Claims, 4 Drawing Figures

METHOD OF MAKING A FISHING LURE

BACKGROUND OF THE INVENTION

The present invention relates to a method of making fishing lure of a rigid foamed polymer having an elongated sleeve mounted therein for attaching screw eyes and hooks to a fishing lure having an elongated sleeve with or without a weight in the fishing lure body and having screw eyes mounted to the fishing lure body and to the sleeve formed thereon.

In the past, there have been a large number of fishing lures of all types, but most of the prior art patents have been made of a balsa wood or formed of a solid plastic material, which might also have a hollow portion therein to make the lure floating. Some years ago, I began the manufacture of a rigid foamed plastic lure body for a floating lure which was molded, then coated and had screw eyes for lines or with hooks attached thereto. This lure works satisfactorily, but with larger lures made for larger fish, the fish tended to pull the hooks from the lure since the rigid plastic foam would not hold the threaded portion of the screw eyes under the greater pressure of the larger fish. The present invention teaches a lure and a method of making a lure which holds the screw eyes and hooks with greater strength to the lure body and allows balancing of the lure by the addition of weights thereto.

Prior art U.S. patents of interest can be broken into several groups in the following manner. One group of prior art patents includes longitudinally extending members which are fixedly attached to the body of a plug and which have connected thereto screws or their equivalent, which screws have eyes to which are connected hooks and/or a line. In U.S. Pat. No. 3,483,651, a shank extension wire extends through a bushing and washer set into a base in order to position the wire and to prevent it from cutting into adjacent portions of the wood body when the wire is subject to a strong pull. The bushing and washer are preferably secured to the body of the lure by suitable adhesive. U.S. Pat. No. 3,344,550 has a body of flexible thermoplastic resin and a flexible link chain coupling molded into the body, thereby permitting lateral flexing of the body. The coupling is capable of sustaining longitudinal loads or stress without distortion under lateral bending of the body. U.S. Pat. No. 2,938,293 shows a weight having a line eye and hook eyes connected thereto, and is embedded in a molded plug body made of polyvinyl resin U.S. Pat. No. 1,948,983 utilizes a hollow, resilient body, which is supported upon a tube. Hooks are threaded into the rear end of the tube. U.S. Pat. No. 1,778,065 shows a weight which is of cylindrical shape and extends into a portion of the body and has a screw connected axially completely through the weight and into the body portion of the lure. U.S. Pat. No. 870,069 shows a weight having threaded apertures extending centrally of a pair of lugs and a rear rod is screwed into one lug and a front rod is threaded into the other lug.

A second group of U.S. patents relates to plugs which generally include a longitudinally extending tubular element secured to the plug's body and having a rod, spring, line, or the like, extending therethrough, so that most of the stress is not on the plug body. U.S. Pat. No. 3,224,133 shows a sheath which is freely mounted on a rod. The sheath is made of flexible and resilient material. A hook is directly connected to a metal rod to which the line is attached an eye. U.S. Pat. No. 3,220,139 shows a rotatable mounting sleeve within which a shaft rotates and slides. A hook is attached to a shaft which is in turn directly connected to a line. U.S. Pat. No. 2,750,701 shows a bore which is lined with a metal liner. Lying within the lines are slidable front and back sleeves. A hook is attached to a rod which is directly connected to a line. U.S. Pat. No. 2,705,413 shows a body portion having an axially drilled hole and a larger diameter hole. A copper tube is press fitted into one hole and has attached about it a removable body member comprising a copper sheet having a diameter such that it is press fitted in the other hole. Hooks are connected to the copper sheets laterally extending doubled portion and a line freely extends through the tube and is knotted at its end at the rear of the tube. U.S. Pat. No. 2,611,207 utilizes laterally extending, loose fitting, hollow cylindrical barrels having lower open portions through which inverted hooks extend. A supporting wire extends through an axial hole. U.S. Pat. No. 2,581,485 shows a movable longitudinal shaft or bar loosely mounted in a longitudinal passage which is provided with a loop to which a hook is attached. U.S. Pat. No. 2,263,743 shows an insert member serving as journals for a rod which is rotatable to change fish hooks. The hook is attached to a rod having an eyelet through which a snap ring is passed. U.S. Pat. No. 2,228,591 shows a bore loosely fitted on a mounting bar. U.S. Pat. No 2,163,666 shows a tubular stem extending through an opening. Another opening is adapted to pass a line, leader or shank of a hook. U.S. Pat. No. 1,295,448 shows a plug utilizing a curved tube of brass having a spring which is normally under tension and upon a fish taking the bait carried by a hook it disengages the end of the spring, thereby drawing it into the tube.

Another group of patents relates to plugs which generally include longitudinally extending tubular elements which rotate or have a shaft, spindle, line, or the like, upon which the body of the plug rotates. U.S. Pat. No. 2,769,268 shows a body container revolving around a nonrotatable hollow tube spindle. U.S. Pat. No. 2,196,506 shows a swivel which is located in a groove of a body which rotates freely therein. U.S. Pat. No. 2,078,816 relates to a rotatable lure having a spindle rotatably mounting a sleeve. The sleeve is rotated by vanes. U.S. Pat. No. 2,001,844 shows a tubular spindle member having a hole extending throughout its length. Front and rear body portions are revolvably mounted on the spindle member. U.S. Pat. No. 1,627,512 utilizes a tube having a shaft which is rotated by a front end propeller wheel thereby moving a fish tail mounted at the tail end of the lure by an eccentric connected to the rear end of a shaft.

SUMMARY OF THE INVENTION

The present invention relates to a method of making a fishing lure which includes the steps of forming mold halves for forming a rigid foamed polymer body in; placing a mask over the molds; and spraying the mold cavities with a barrier coating which will act as a prime coating for the lure body once the body has been removed from the mold. The next step is slipping an elongated hollow sleeve onto an elongated wire mandrel, and alternatively, sliding a weight having a bore therethrough onto the mandrel. The mandrel is then mounted to one half of the mold with the sleeve within the bounds of the mold cavity and a second mandrel be applied transverse to the first. At least one mold half may then be charged with a polymer material; the mold halves clamped together; and the lure body formed therein. The lure body is removed from the mold; the mandrel is removed from the lure body; and screw eyes, with or without hooks, are attached in the mandrel holes to the hollow sleeve with one being attached to the metal weight, when a metal weight is used, through the openings left by the mandrel openings.

The fishing lure apparatus provides a rigid foam polymer body such as a foamed polyurethene with a body having a coating thereover and an elongated hollow sleeve of a solid polymer, or the like, formed in the foamed polymer body. A plurality of openings extending into the foamed polymer body are axially aligned with the elongated hollow sleeve at each end thereof in one case, and an additional aperture is transverse to the hollow sleeve. The openings have screw eyes attached into the foamed polymer body and into the hollow sleeve. One screw eye may be attached into the opening and the metal weight, when a weight is added to the lure.

BRIEF DESCRIPTION OF THE DRAWINGS

Other objects, features and advantages of the present invention will be apparent from the written description and the drawings, in which.

DESCRIPTION OF THE PREFERRED EMBODIMENT

Figure 2:
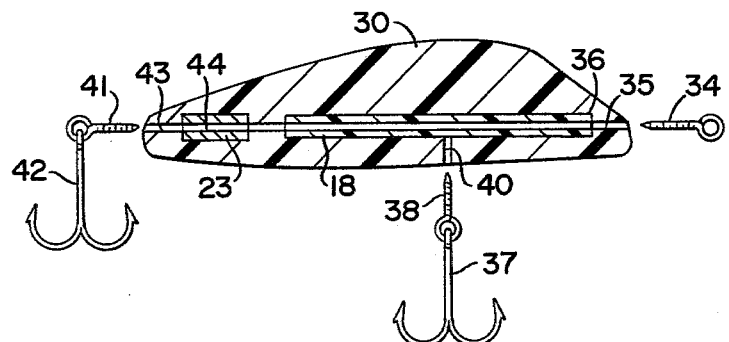
FIG. 2 is a sectional view taken through a fishing lure having the screw eyes separated from the lure body.
Figure 3:
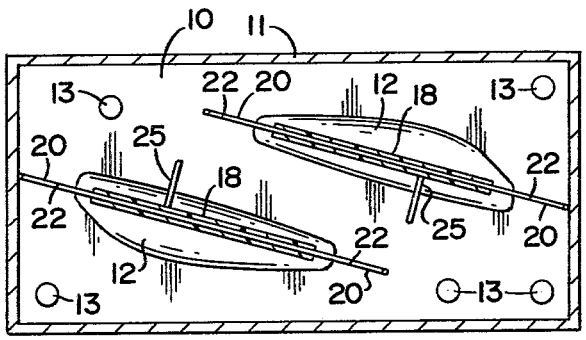
FIG. 3 shows a mold half having mandrels mounted therein for the making of a fishing lure in accordance with the process of FIG. 1.
Figure 4:
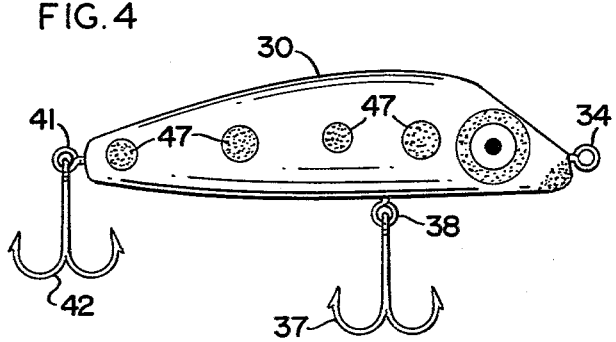
FIG. 4 shows a side elevation of a fishing lure in accordance with the present invention.
Figure 1:
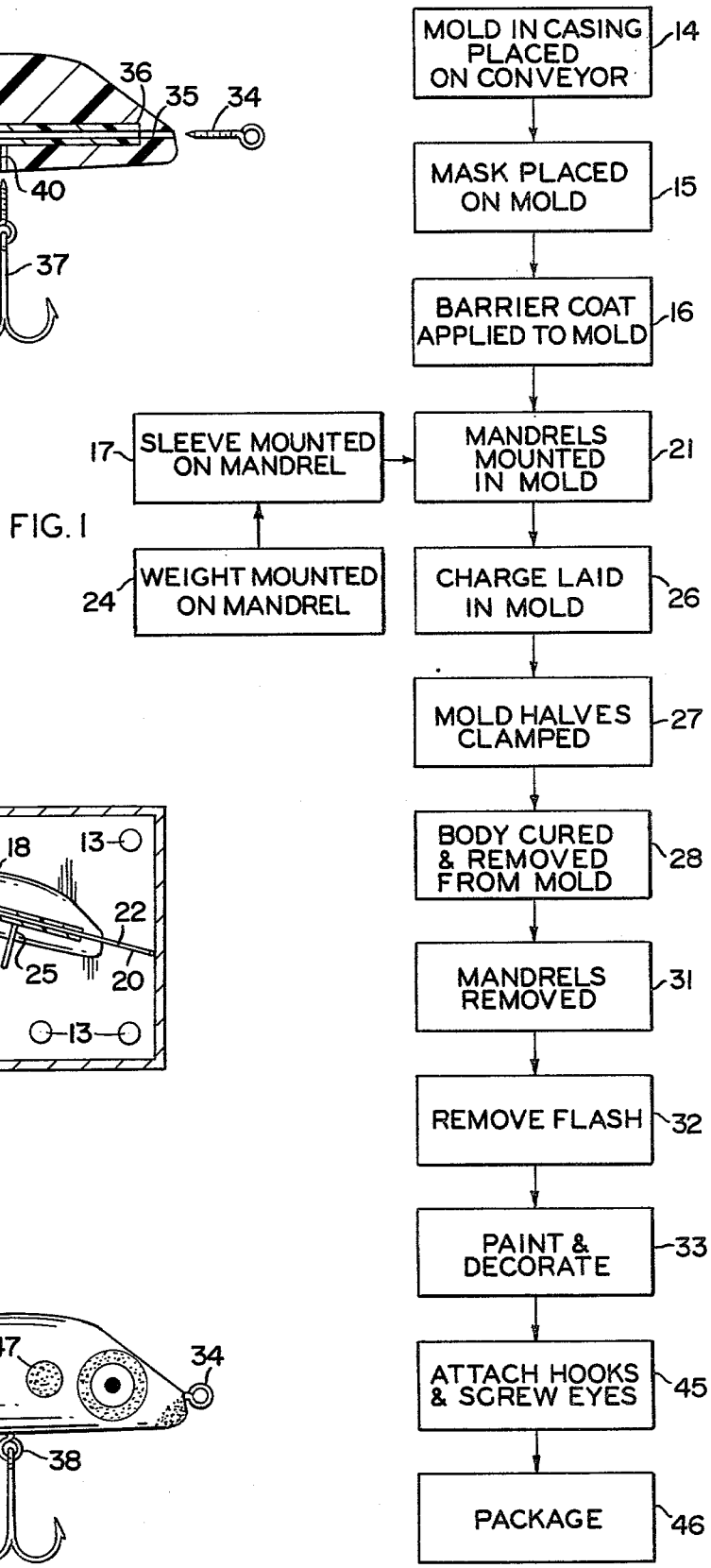
FIG. 1 is a flow diagram of a method of making a fishing lure in accordance with the present invention.

Referring to the drawings, and especially to the flow diagram of FIG. 1, a process of making a fishing lure as illustrated in FIG. 4 may be better understood in connection with FIGS. 2 and 3. The process requires that a mold 10 which may be made of rubber or the like, be mounted in a casing 11. The mold 10 might have a pair of cavities 12 formed therein for forming a lure body and the mold 10 cooperates with a second mold half having matching cavities and may also have alignment studs 13, even though the alignment studs might be attached to the aluminum casing 11 as desired. The mold in its casing is placed on a conveyor in accordance with the block 14 in the flow diagram of FIG. 1. A mask is placed over the mold 10 to cover all of the mold except for the cavities 12 as in step 15 for applying the barrier coat of 16 to the mold cavity 12. The mask prevents the spraying of the barrier coat onto the remaining portions of the mold and aids in the cleanup of the molds 10 following the production of the fishing lure. The mask may be removed following the spraying of the barrier coat, and in a separate side operation 17, an elongated sleeve 18 is slipped onto an elongated wire mandrel 20. It will be appreciated that a large number of mandrels can be prepared in advance for mounting onto the mold half 10 in accordance with the step 21. The mandrel 20 extends all of the way across the cavity 12 and is positioned in grooves 22 on each end of the cavity 12.

In an alternate embodiment of the method, a metal weight such as a hollow lead sleeve 23, (FIG. 2) may be added in step 24 to the mandrel 20 and would also be located within the cavity 12 of the mold 10 when the mandrel is mounted in the mold. In addition, a small pin mandrel 25 may be mounted in a transverse groove to be mounted transverse to the mandrel 20 and so as to extend into the cavity 12 and to abut transversely against the sleeve 18. A small groove in the mold also holds the pin mandrel 25 to the mold 10. Once the mandrel is mounted into the mold half 10 a charge is laid into the mold 10 cavity 12 at 26, which charge would consist of a polymer resin and catalyst of the predetermined amount depending upon the size of the plug to cause the polymer to foam into the mold when the halves 10 are clamped together in step 27. The lure, of course, requires that the right amount and properly mixed resin and catalyst be added to the mold to prevent air pockets and to provide a rigid foamed body. Once the mold halves 10 are clamped together, the charge expands to fill the mold, the body is cured in about six minutes, and the body is removed from the mold in step 28. The body having the mandrels 20 passing therethrough with the sleeve 18 formed in the mold and the mandrel 25 still in the body 30 is taken from the mold having the barrier coating applied mold cavities in step 16 forming a primer coating on the body 30. The mandrels are then removed, such as grasping with pliers and pulling the mandrels from the body in step 31 leaving the sleeve 18 and 23 located in the body. The flash is removed in step 32 from the body which is then painted and decorated 33 and a line screw eye 34 is attached to the front opening 35 (in FIG. 2) and to the front portion 36 of the sleeve 18. A hook 37 is attached to a screw eye 38 into the transverse opening 40 transversely into the sleeve 18 and a third hook eye 41 having a hook 42 therein is connected into the opening 43 where the mandrel 20 has been pulled from the body 30 and to the hollow bore 44 of the lead weight 45. In the embodiment of the mold of FIG. 3 the sleeve 18 extends to cover the position of the weight 23 and the weight 23 is not used. Once the hooks and screw eyes are attached in step 45 the lure may be packaged at 46 such as by blister packaging.

The finished lure is illustrated in FIG. 4 having the body 30 with decorative painting 47 on the body thereof and with the front screw eye 34 attached, the bottom screw eye 38 attached with the hook 37 attached thereto, and the rear screw eye 41 having the hook 42 attaching to the rear of the lure. Since the lure is made of a rigid foam polymer such as polyurethene, it tends to have improved flotation without a hollowed cavity portion formed in the body and the sleeve 18, which may be made of a solid polymer, such as an ABS plastic, adds the strength to hold the threads of the screw eyes 34, 38 and 41. If a metal 23 is used, the threads of the threaded eye 41 are attached into the weight 23. The lead weight 23 can be used both for holding the screw eye 41 and for adding additional weight and balance to the lure. The present invention is, of course, not to be construed as limited to the particular forms shown, which are to be considered illustrative rather than restrictive.

I claim:

1. A method of making a fishing lure comprising the steps of:

barrier coating each of two fishing lure body mold halves;

slipping at least one elongated hollow sleeve onto a mandrel;

mounting said mandrel to one of said mold halves with said elongated hollow sleeve positioned over the mold half cavity;

charging a mold half cavity with a foam polymer material;

clamping a pair of mold halves together and curing said fishing lure body therein;

removing said fishing lure body from said mold;

removing said mandrel from said lure body; and attaching at least one screw eye to said lure in said elongated hollow member molded into said lure body through the removed mandrel openings whereby a foam polymer lure is made having reinforced screw eye attachments.

2. The method in accordance with claim 1, in which the step of mounting a mandrel to one said mold halves includes the mounting of a second mandrel transverse to the first and extending into the mold half cavity whereby an opening is formed aligned transversely to an elongated hollow sleeve for attaching a screw eye.

3. The method in accordance with claim 1 or 2 in which the step of slipping at least one elongated hollow sleeve on a mandrel includes the slipping of a hollow weighted sleeve onto the same mandrel whereby a weight is added to the lure.

4. The method in accordance with claim 2 in which the step of attaching at least one screw eye to said lure includes attaching a screw eye into one end of the lure axially extending into the sleeve formed in the lure through the opening formed by the removed mandrel, and a second screw eye having a hook attached thereto is attached to the lure body through the opening from the other end of the lure body formed by the removal of the mandrel and a third screw eye having a hook attached thereto is attached through the opening formed by the second transverse mandrel perpendicularly through the elongated hollow sleeve.

5. The method in accordance with claim 1, 2 or 4 in which the step of barrier coating each of fishing lure body mold half cavities includes placing a mask over the mold to cover the top of the mold, said mask having an opening therein shaped to conform to the edge of the mold cavity to prevent the barrier coating covering the remainder of the mold.

6. The method in accordance with claim 1, 2 or 4 in which the step of removing the mandrel from the fishing lure body includes grasping the mandrel with a clamping member and sliding the mandrel from one end of the body leaving the elongated hollow sleeve in the body.

* * * * *